United States Patent
Kowalski

[15] 3,648,039
[45] Mar. 7, 1972

[54] OPTICAL CORRELATOR FOR AUTOMATIC STEREOPLOTTING APPARATUS

[72] Inventor: Daniel C. Kowalski, Southgate, Mich.
[73] Assignee: The Bendix Corporation
[22] Filed: July 11, 1969
[21] Appl. No.: 841,085

[52] U.S. Cl. .................. 235/181, 250/220 SP, 343/5 MM, 350/162 SF, 356/2
[51] Int. Cl. .................. G06g 7/19, G06g 9/00
[58] Field of Search ......... 356/2, 168; 350/6, 7; 340/149; 250/200–208, 220 SP; 353/5, 6, 7; 235/181; 343/5 MM

[56] References Cited

UNITED STATES PATENTS

| | | | |
|---|---|---|---|
| 3,110,762 | 11/1963 | Frank | 350/6 X |
| 1,883,019 | 10/1932 | Shore | 350/6 |
| 2,787,188 | 4/1957 | Berger | 235/181 X |
| 2,884,540 | 4/1959 | Shockley | 250/200 |
| 2,964,639 | 12/1960 | Hobrough | 356/2 |
| 3,194,511 | 7/1965 | Cohen | 343/5 |

Primary Examiner—Malcolm A. Morrison
Assistant Examiner—Felix D. Gruber
Attorney—Plante, Arens, Hartz, Smith and Thompson and William L. Anthony, Jr.

[57] ABSTRACT

A coherent optical correlator having a canted optical flat for optically displacing the imagery on one transparency of a stereo pair with respect to the imagery on the other transparency. The canted optical flat is rotatable such that the image is displaced in a circular path. Image misalignment is computed by multiplying the output signal of the correlator by sine and cosine functions which are in synchronism with the rotating optical flat. The optical correlator is also provided with a multiaperture output section which detects relative image distortions through independent correlation of the imagery received by each aperture.

16 Claims, 21 Drawing Figures

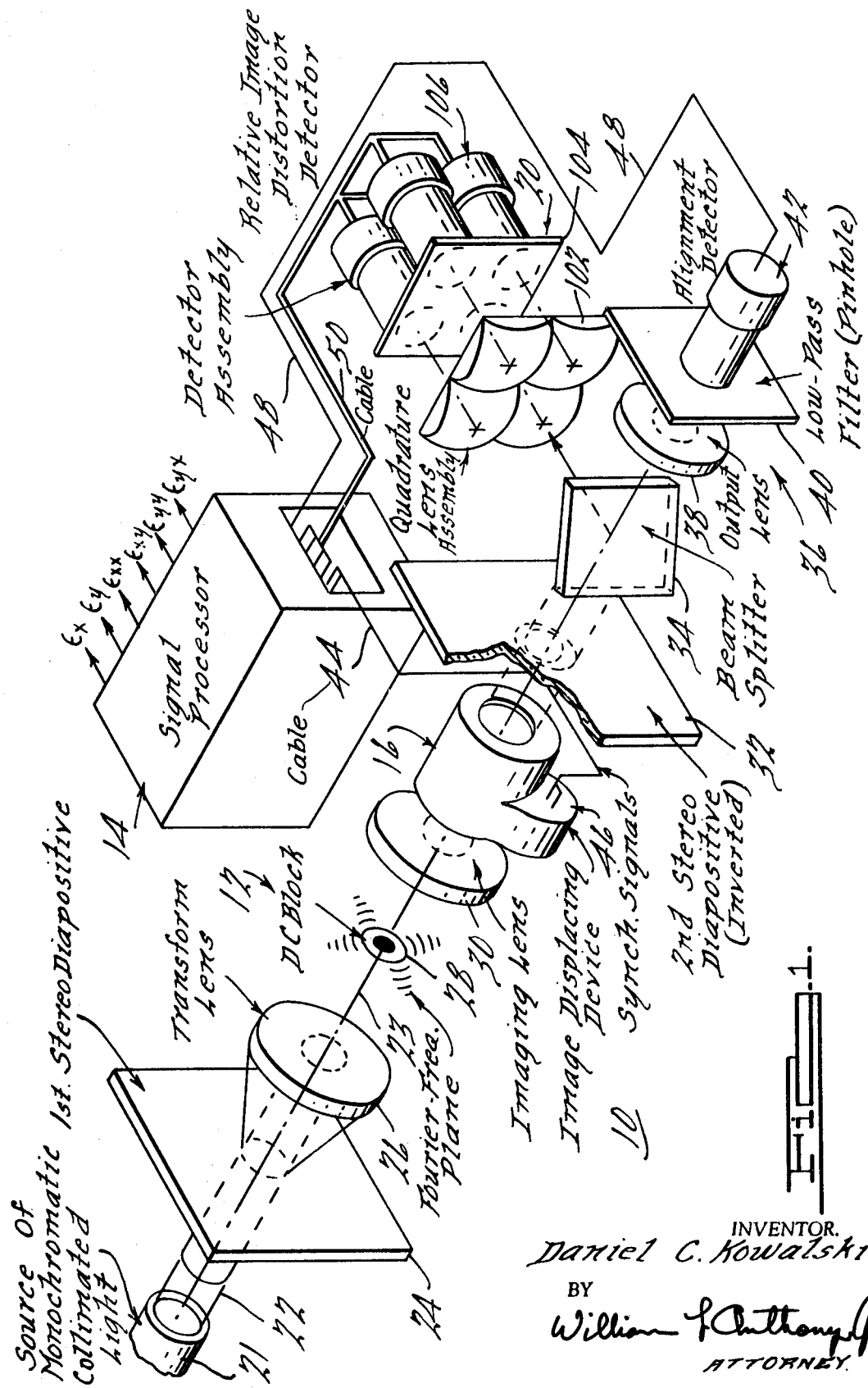

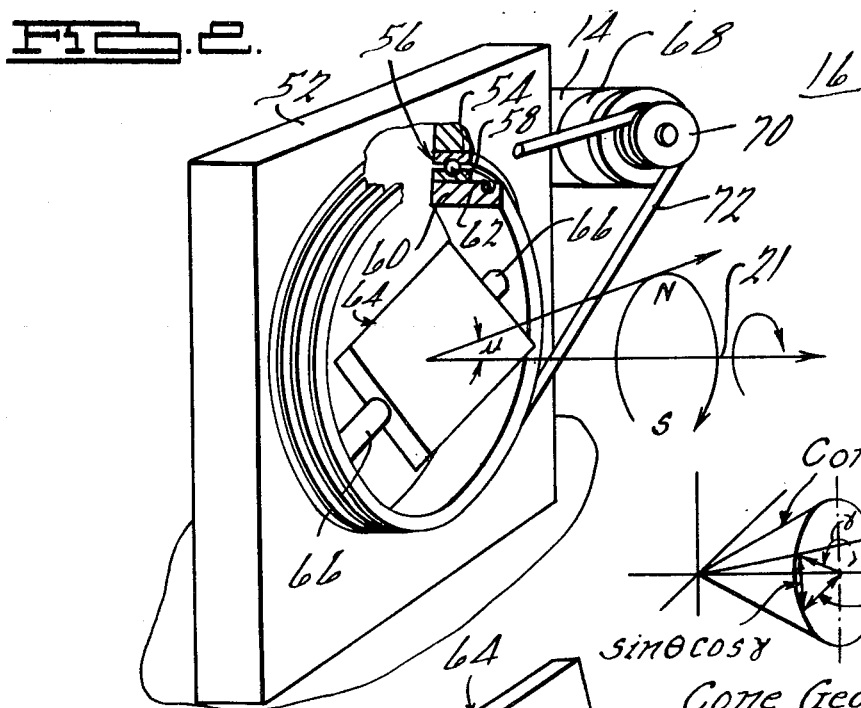

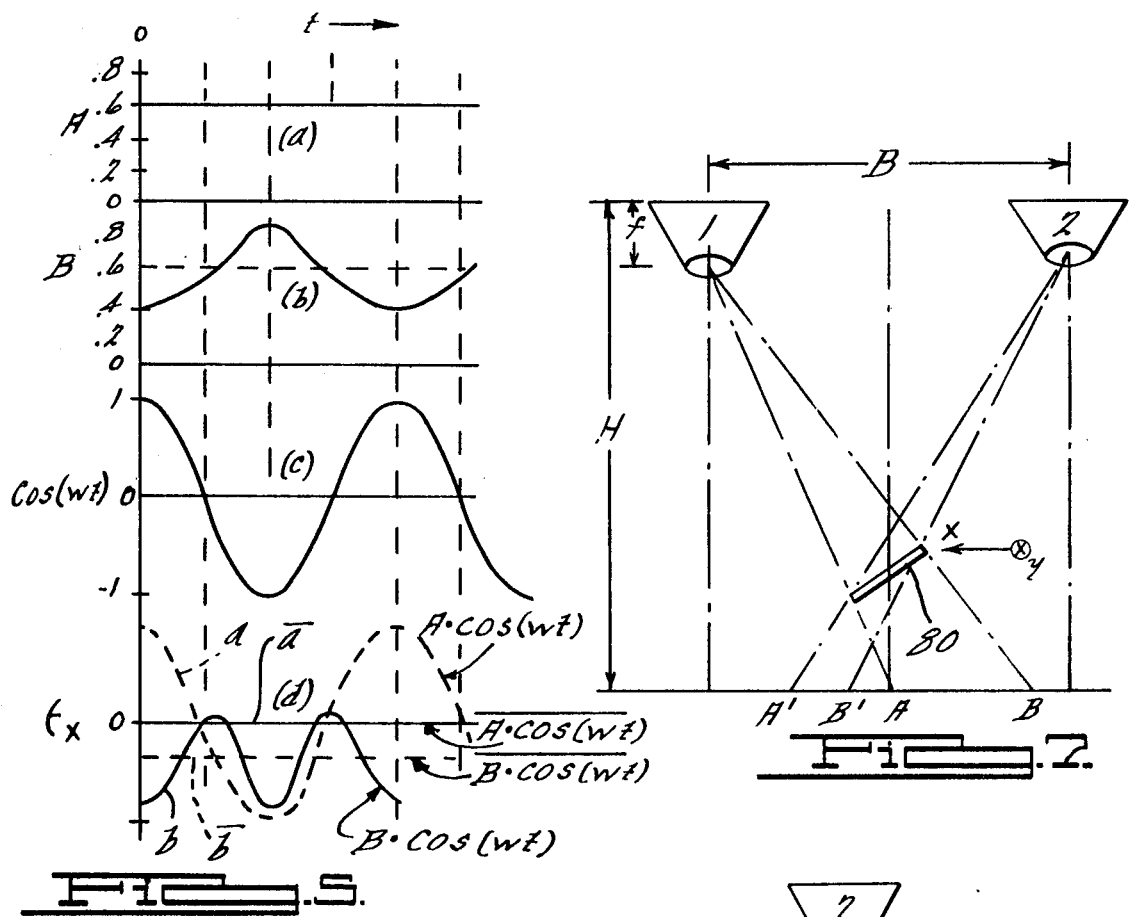
FIG. 5.
FIG. 7.
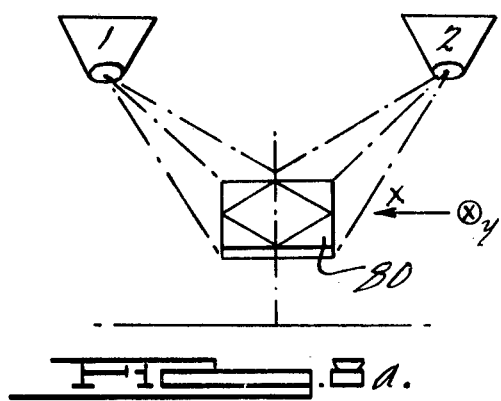
FIG. 8a.
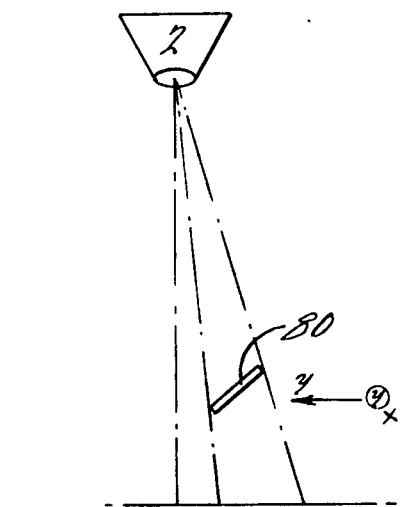
FIG. 8b.
INVENTOR.
Daniel C. Kowalski.
BY
William F. Anthony
ATTORNEY.

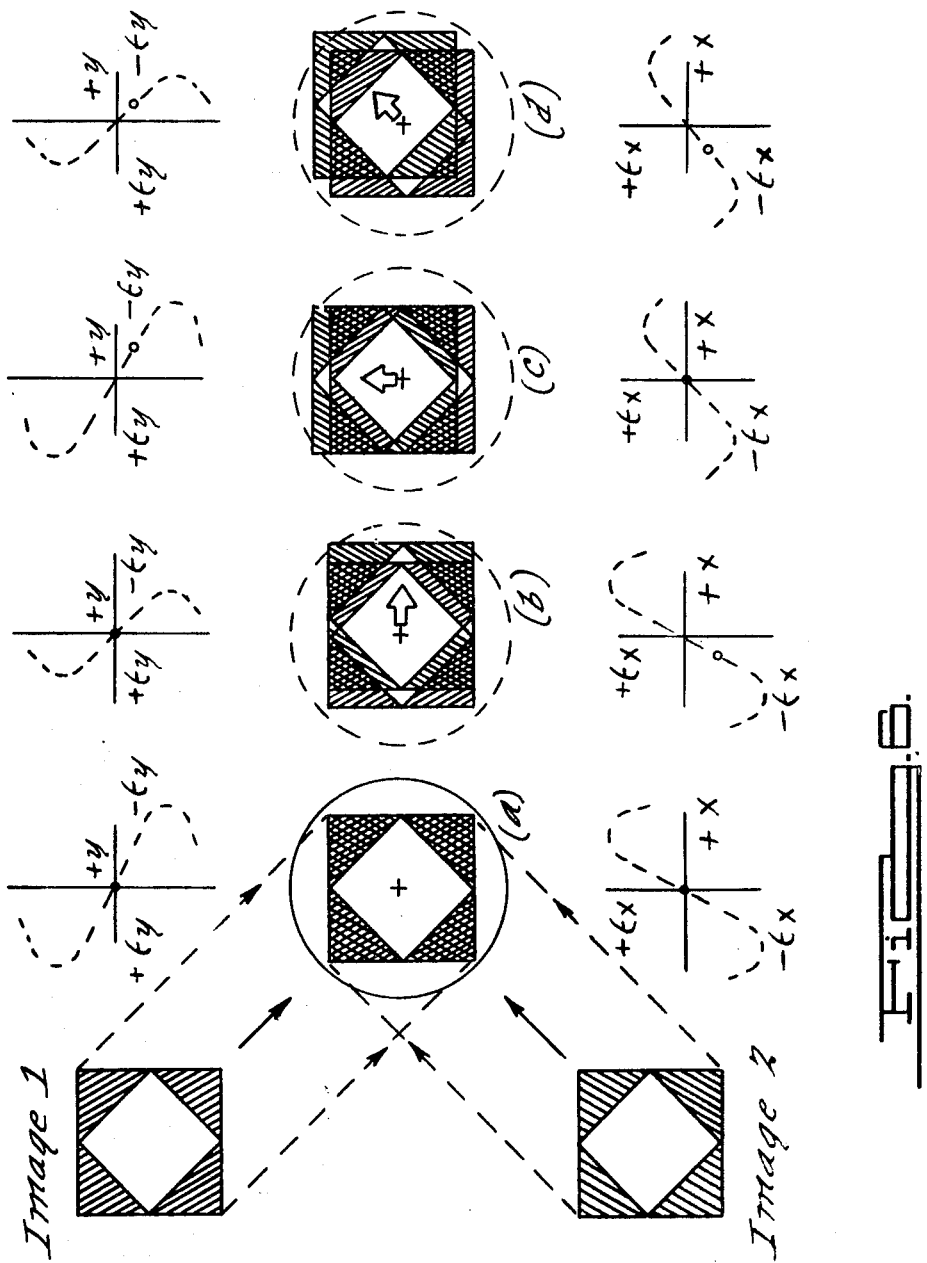

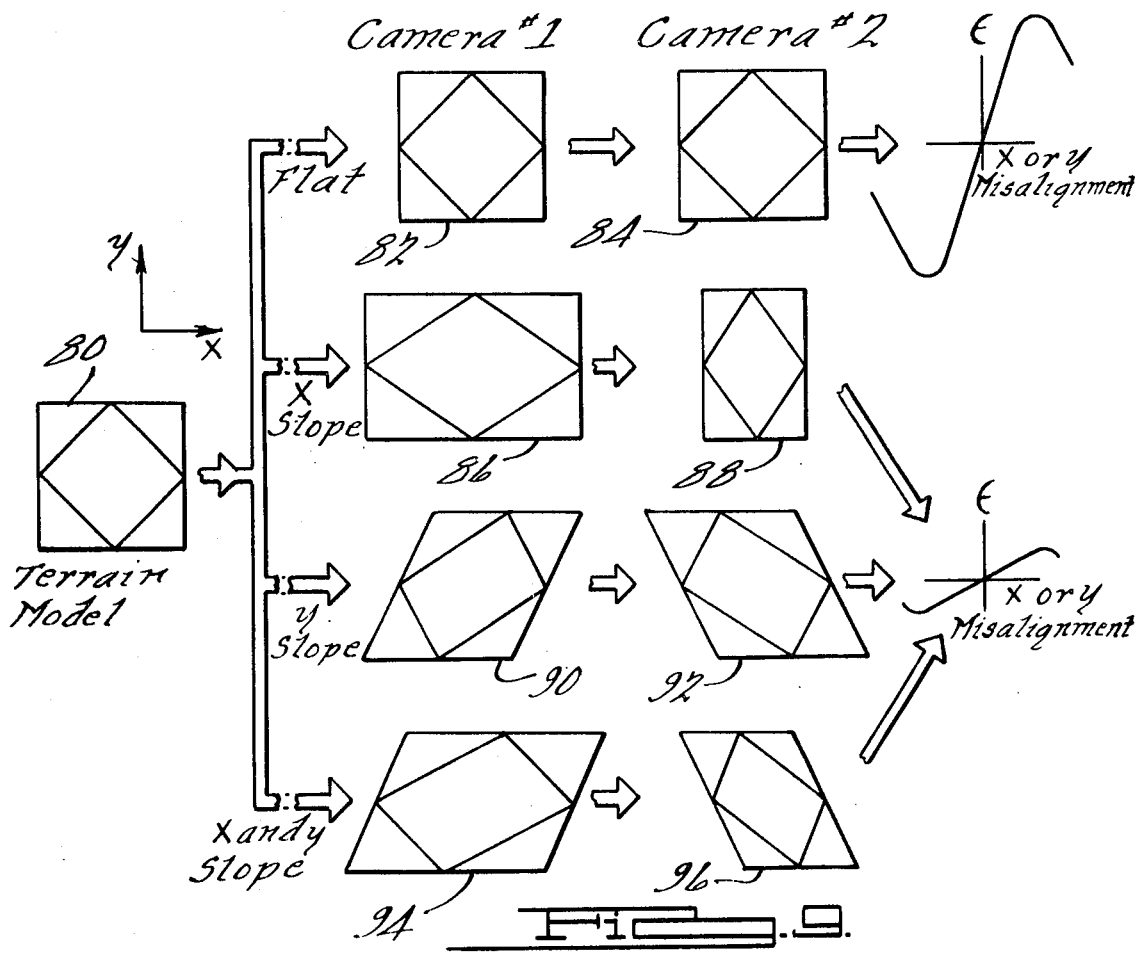
FIG. 9.
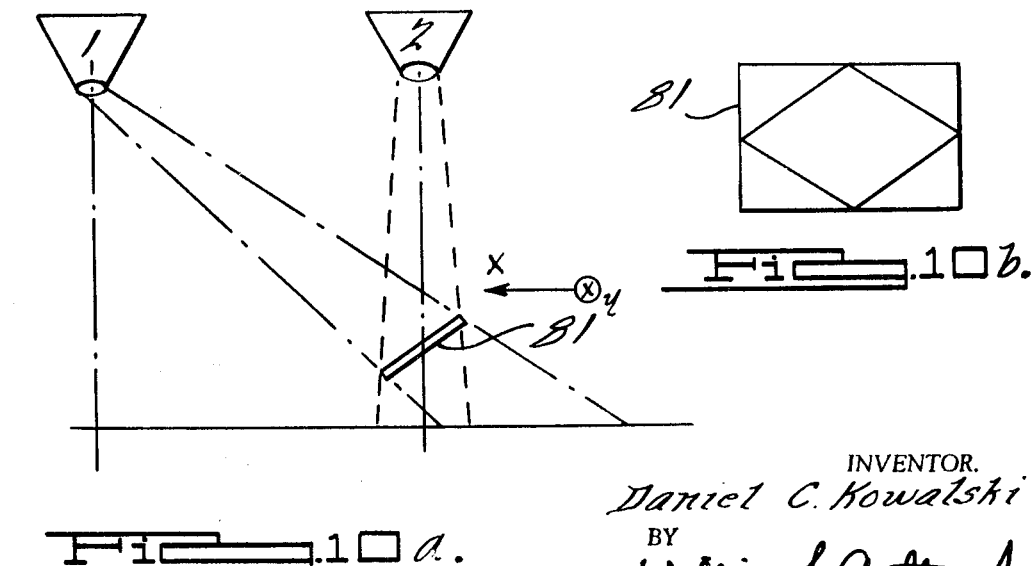
FIG. 10a.
FIG. 10b.
INVENTOR.
Daniel C. Kowalski

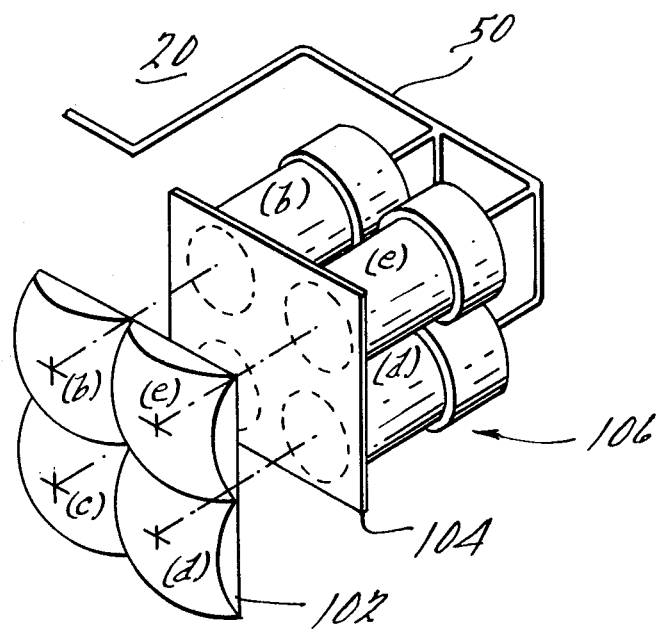
FIG. 12.
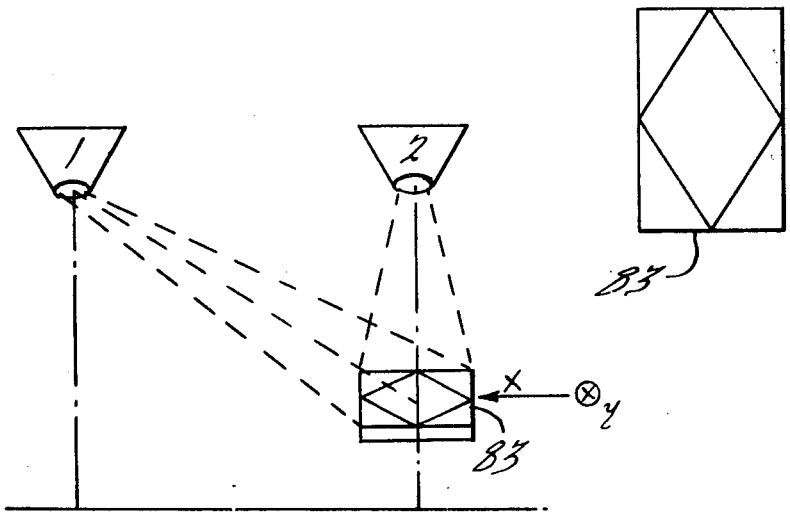
FIG. 13b.
FIG. 13a.
INVENTOR.
Daniel C. Kowalski
BY
William P. Althoff
ATTORNEY.

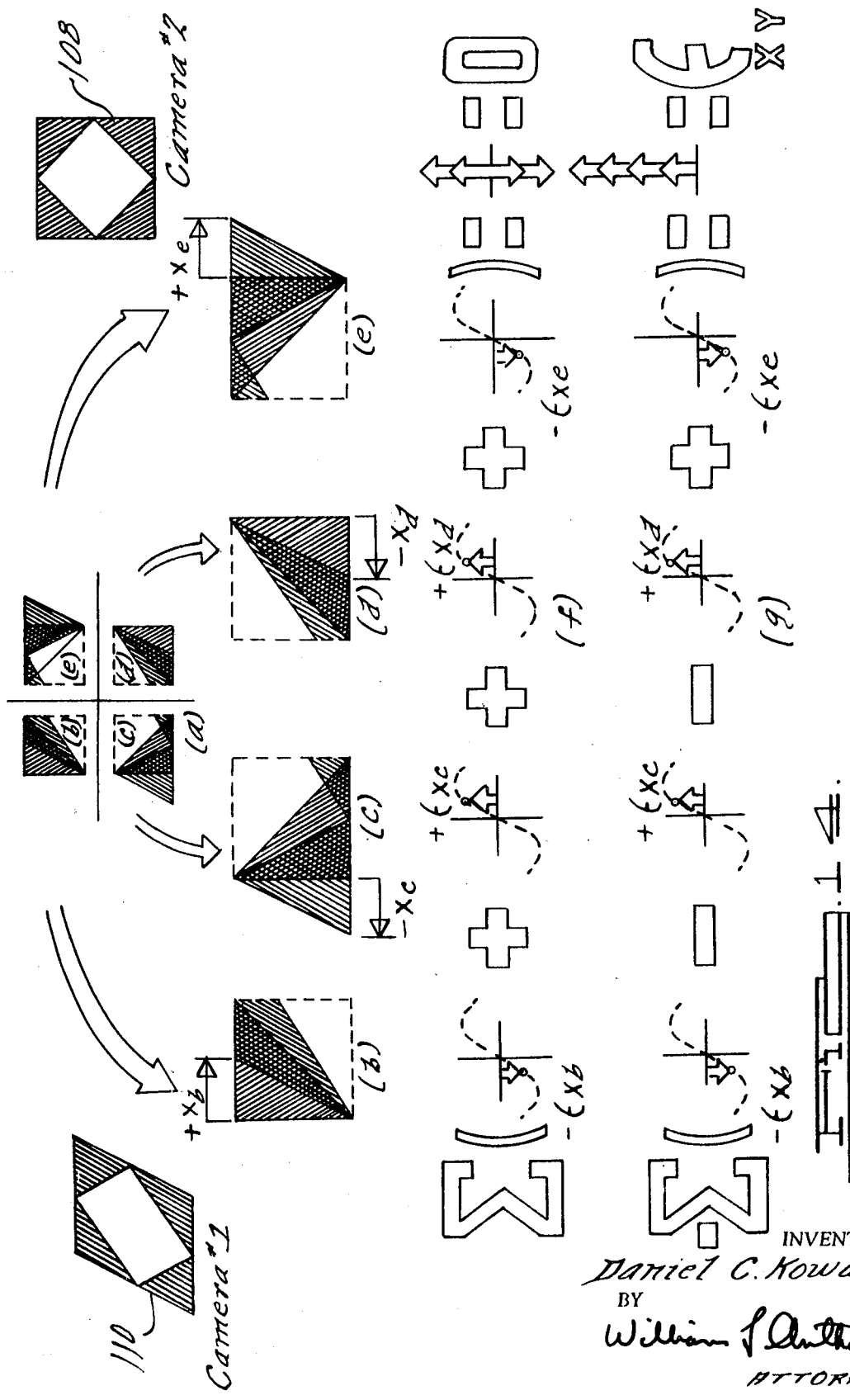

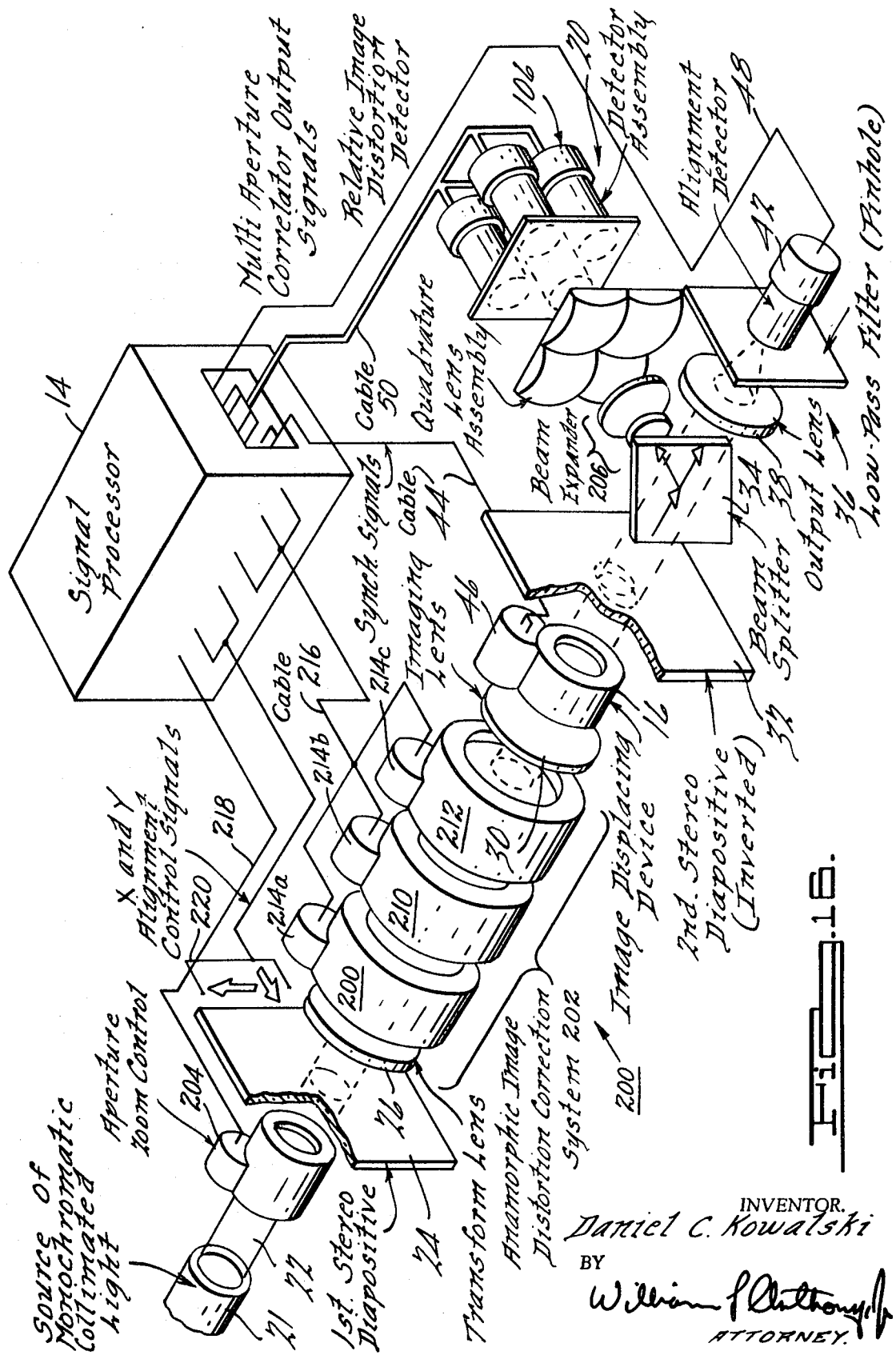

OPTICAL CORRELATOR FOR AUTOMATIC STEREOPLOTTING APPARATUS

BACKGROUND OF THE INVENTION

1. Field of the Invention

Optical correlators and automatic stereoplotting apparatus.

2. Description of the Prior Art

Elevation contour maps and terrain profiles are commonly constructed by measuring the parallax of corresponding imagery on a pair of stereo terrain photographs. The parallax is indicative of the elevation of the terrain portrayed in the corresponding imagery. It will be appreciated that the identification and location of corresponding imagery is fundamental to the parallax measuring process.

Various methods have been developed to identify and locate corresponding imagery, and thereafter, to measure parallax. The most prevailing automatic method uses electronic scanners and electronic correlating computers to perform automatic image matching. For example, see Chapter 15, Vol. 2, "Manual of Photogrammetry," American Society of Photogrammetry, 1966. Optical correlation methods also have been developed to measure parallax and are of particular interest with respect to this invention. The present invention will be better appreciated if the prior art optical methods are briefly considered.

The prior art optical methods generally use image-image or image-matched filter coherent optical correlators to match the imagery in a small area on a first transparency with the image in a corresponding small area on a second transparency. More particularly, in the image-image correlators, a small portion of the imagery of a first transparency of the pair of stereo transparencies is illuminated to provide a light image representative thereof. A Fourier transform of the light image is obtained by passing it through a transform lens. A DC block is used to remove gross transmittance. Thereafter, an imaging lens is used to provide an inverted reconstructed image which is transmitted through the second stereo transparency. The resulting light image represents the product of the illuminated imagery on the transparencies. An output lens provides a Fourier transform of the product light image. A pinhole aperture is used to filter the correlation signal from the Fourier transform of the product light image. Optimum correlation or matching of the illuminated imagery provides a correlation signal of maximum intensity. For further information on these optical systems, see: L. J. Cutrona, E. N. Leith, C. J. Palermo, L. J. Porcello, "Optical Data Processing and Filtering Systems," IRE Transactions on Information Theory, Vol. IT-2, No. 2, June 1960, pp. 386–400; and A. Vander Lught, "Signal Detection by Complex Spatial Filtering," IEEE Transactions on Information Theory, Vol. IT-10, No. 2, Apr. 1964, pp. 139–145.

Optimum correlation can be obtained by relative movement of the imagery on the photographic transparencies, for example, by movement of either photographic transparency. When optimum correlation is obtained, the imagery of the second transparency on the optical axis corresponds to the illuminated imagery of the first transparency. The location of the corresponding imagery on the second transparency may be then recorded by noting the relative positions of the transparencies. Parallax is measured by comparing these relative positions with a reference position thereby determining the shift of the imagery caused by elevation changes. Therefore, it will be appreciated that an accurate device for relatively displacing the imagery on the transparencies is required to identify and locate corresponding imagery and thus to enable parallax measurement.

Devices for optically displacing an image are known. These devices generally use prisms or the like having a predetermined angular relationship between the input and output faces. Light images transmitted through the prism are laterally displaced in accord with the angular relationship of the faces. However, the angular spectrum of a light image transmitted through a prism is not preserved. A prism would not be suitable for use as a device to displace the imagery on one transparency with respect to the other in an optical correlator since a change in the angular spectrum of an image would also change the location of the correlation signal, and consequently, movement of the pinhole filter in synchronism with the movement of the image would be required. This requirement would add to the cost and complexity of the system.

It will be appreciated that exact matching of two images can only be achieved when they are essentially identical. Corresponding images of stereo terrain photographs generally are not identical. In fact, the images can differ significantly in shape. The shape difference, commonly referred to as relative image distortion, is created by the lateral separation of the cameras which provide the photographic transparencies and the consequent differing angles of view of the cameras. The distortion reduces the effectiveness of the correlator in identifying corresponding images and further reduces the accuracy of the correlator in determining the precise location or coordinates of the corresponding images. Therefore, it is desirable to detect and correct relative image distortion. It will be appreciated that the images are arranged for movement in the plane of their surfaces. Movement is then effected to align the images before correlation measurements are made and also after correlation measurements are made so that additional correlation measurements with respect to another point on the images can be made.

Although it is known how to electronically detect relative image distortion in electronic correlators, a suitable method for detecting relative image distortions in optical correlators has not been available heretofore.

SUMMARY OF THE INVENTION

The present invention provides a novel device for optically displacing an image which is particularly suitable for use in optical correlators. The image displacing apparatus of this invention includes an optical flat which is changeably canted with respect to a received light image to optically displace the image in accord therewith. The cant of the optical flat may be defined by its angle with respect to the optical axis on which the image is received and the direction of cant with respect to that axis. Accordingly, the cant of the optical flat may be changed by changing either the angle of cant or the direction of cant. In the preferred embodiment, the angle of cant with respect to the optical axis is fixed and the optical flat is rotated about the optical axis so as to vary the direction of cant with respect to that axis.

This invention also provides an apparatus for determining image misalignment using an image-displacing device such as that described above. Particularly, the image-displacing device is interposed between the two transparencies to be correlated to cause the imagery of the first transparency to move in a circular pattern with respect to the imagery of the second transparency. Means are provided for obtaining a sine signal and a cosine signal which are in synchronism with the rotation of the image. The output signal of the correlator is multiplied by the sine signal to provide an error signal which is representative of misalignment in one direction ($y$); and the correlator output signal is multiplied by the cosine signal to provide an error signal representative of the misalignment in a direction ($x$) which is orthogonal to the first direction.

The present invention further provides a novel output apparatus for a coherent optical correlator which detects relative image distortion. Particularly, the light signal of the correlator representative of the product of the two images is divided into a plurality of portions, for example, by a quadrature lens dividing the product image into four quarters. The image misalignment, i.e., local $y$ or $x$ parallax, for each portion is independently obtained, for example, by using the technique described above. The orthogonal misalignment values for each portion are used in an additive/subtractive computing system to determine the relative skew or elongation of the images.

The relative image distortion values may be used to control an anamorphic image distortion correction system so as to modify one of the images in a manner to create near identity between the images, and accordingly, to provide maximum correlation accuracy.

BRIEF DESCRIPTION OF THE DRAWINGS

FIG. 1 is an illustration of an image-image coherent optical correlator incorporating the image-displacing device, the misalignment detector, and the relative image distortion detector of this invention.

FIG. 2 is a detailed illustration of the device shown in FIG. 1 for optically displacing a light image.

FIGS. 3a, 3b, and 3c are illustrations of or relating to the canted optical flat used in the image-displacing device of FIG. 2, and particularly, illustrations of the manner of operation of the canted optical flat.

FIG. 4 is a three-dimensional graph illustrating the relationship between the correlation function of two stereo images and the effects of the image displacement provided by the image-displacing device of FIG. 2.

FIG. 5 is a series of graphs illustrating the image misalignment computing function of the signal processor shown in FIG. 1.

FIG. 6 is a series of illustrations and graphs showing the relationships of the misalignment signals provided by the optical correlator of FIG. 1.

FIG. 7 is an illustration of the origin of relative image elongation due to x-slope.

FIGS. 8a and 8b are illustrations of the origin of relative image skewing due to y-slope.

FIG. 9 is a graphic illustration of various relative image distortions originating as shown in FIGS. 7 and 8.

FIGS. 10a and 10b are illustrations of the origin of a simplified case of relative image elongation due to x-slope.

FIG. 12 is a detailed view of the correlator output apparatus which divides the imagery into four portions as illustrated in FIG. 11.

FIGS. 13a and 13b are illustrations of the origin of a simplified case of relative image skewing due to y-slope.

FIG. 14 is an illustration of the determination of relative image skewing, such as that which may have originated from y-slope as illustrated in FIG. 13, wherein the images are divided into four equal portions.

FIG. 16 is an optical correlator like that of FIG. 1, but further including an anamorphic image distortion correction system for providing optimum image correlation.

DETAILED DESCRIPTION OF THE PREFERRED EMBODIMENTS

Figure 11:
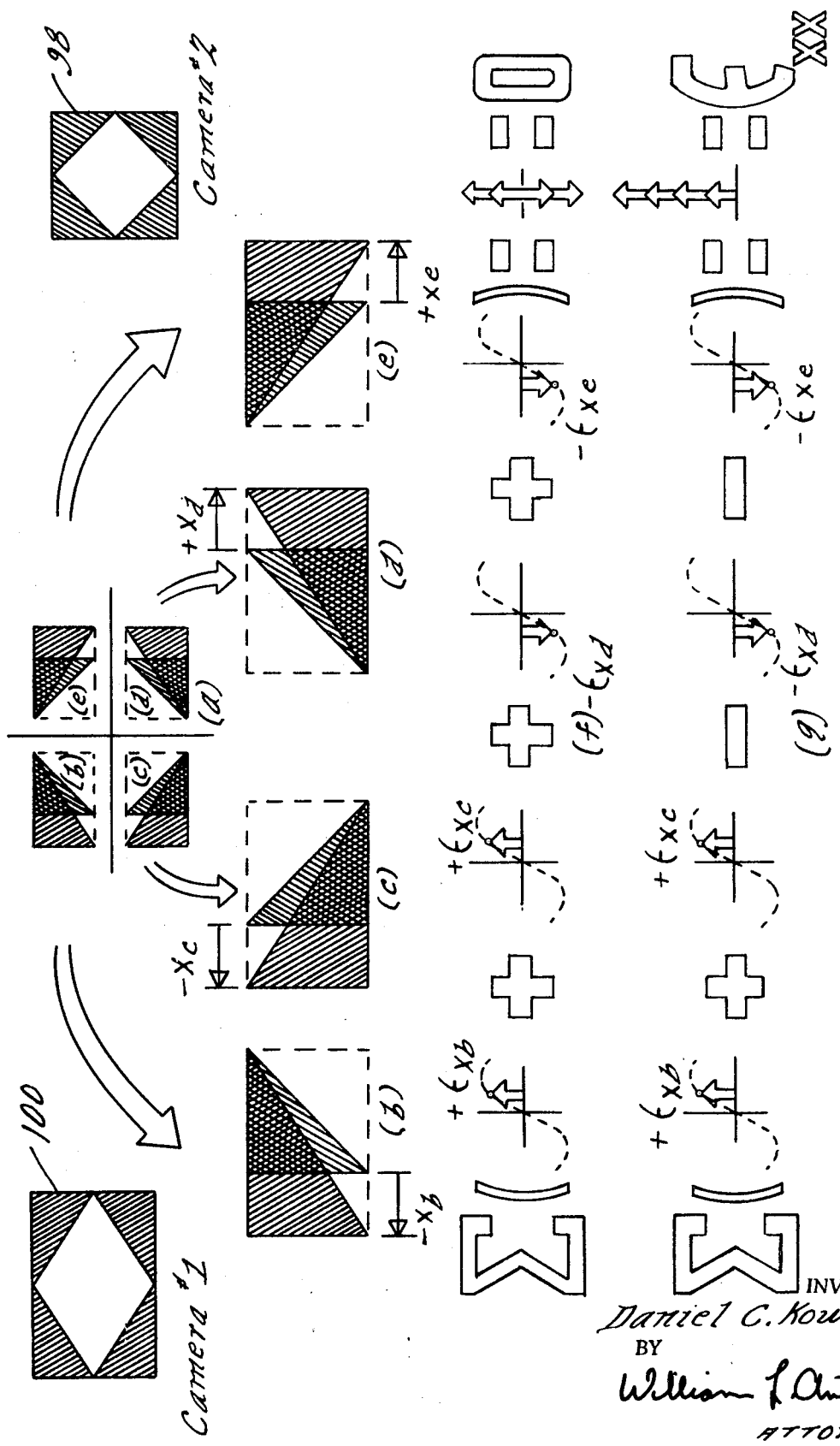
FIG. 11 illustrates a procedure for measuring relative image elongation, such as that which may have originated from x-slope as illustrated in FIG. 10, wherein the images are divided into four equal portions.

Description of the Optical/Electronic Correlating System 10 of FIG. 1

The optical/electronic correlating system 10 of FIG. 1 includes an image-image coherent optical correlator 12 and an electronic signal processor 14. The image-image coherent optical correlator 12 includes an image-displacing device 16 according to this invention and a multiple aperture output section 20 according to this invention.

The image-image coherent optical correlator 12 further includes source 21 for providing a collimated monochromatic light beam 22 (e.g., laser light) projected on an optical axis 23 for transmission through a very small portion of a first stereo diapositive 24 (i.e., a positive photographic transparency) to provide a light signal representative of the imagery in the illuminated portion. A spherical transform lens 26 is positioned on the optical axis 23 a focal length distance from the stereo diapositive 24 to receive the light transmitted through the first stereo diapositive 24. A DC block 28 is positioned on the optical axis 23 in the back focal plane of the spherical transform lens 26 to remove the gross transmittance of the light transmitted through the first stereo diapositive 24. A spherical imaging lens 30 is positioned on the optical axis 23 a focal length distance from the DC block 28.

The image-displacing device 16 according to this invention is positioned on the optical axis 23 a distance less than the focal length of the spherical imaging lens 30. A second stereo diapositive 32 is positioned at the back focal plane of the spherical imaging lens 30 to receive light transmitted through the image-displacing device 16. The second stereo diapositive 32 is inverted for reasons to be apparent hereinafter. A beam splitter 34, receiving the light transmitted through the second stereo diapositive 32, is provided to accommodate two output systems. A first output system 36 having a single aperture is positioned to receive the light image transmitted through the beam splitter 34 and a second output system 20 having a multiple aperture is positioned to receive the light reflected from the beam splitter 34.

The first output system 36 includes a spherical output lens 38, a pinhole aperture 40 positioned at back focal plane of the spherical output lens 38, and a photocell 42 positioned to receive light transmitted through the pinhole aperture 40. The output of photocell 42 is described with respect to FIG. 4.

The second output system 20 is described in detail hereinafter in connection with FIG. 12.

Signal processor 14 is provided with a signal on line 44 from the image-displacing device 16 which is representative of the circular displacement imparted to the image by the device 16. For example, the image-displacing device 16 may have associated with it a resolver or an AC generator to provide appropriate signals. The signal processor 14 also receives an output signal from the photocell 42 of the first output system 36 on line 48 and four output signals from the multiple aperture output system 20 on four-conductor cable 50. The circuitry of the signal processor 14 is described in detail hereinafter in connection with FIG. 15.

Description and Operation of the Image Displacing Device 16

The image-displacing device 16 of FIG. 1 is shown in detail in FIG. 2. Image-displacing device 16 includes a frame 52 for mounting an outer race 54 of a ball bearing 56 therein. The ball bearing 56 is also provided with an inner race 58 having an annular member 60 internally mounted for rotation therewith. The annular member 60 is provided with a belt groove 62 in the manner of a friction drive pulley.

An optical flat 64 is rigidly mounted internally of the annular member 60 by members 66 which traverse a diameter of the annular member 60. The optical flat 64 is mounted on the optical axis 23 and is canted at an angle $\Psi$ with respect thereto.

The frame 52 is positioned such that the annular member 60 is perpendicular with respect to the optical axis 23 and such that rotation of the annular member 60 is about the optical axis 23. A motor 68 is provided having a pulley 70 for driving a belt 72 which is frictionally engaged with the groove 62 of the annular member 60. Accordingly, rotation of the pulley 70 by the motor 68 rotates the annular member 60, and consequently, the optical flat 64, in proportion thereto. Motor 68 is driven at a constant speed by a convenient outside source so that optical flat 64 also rotates at a constant speed.

Signals representative of the rotation of the optical flat 64 are provided by a resolver 74 which is connected to the motor 68 for rotation therewith.

In operation, the position of an image transmitted through the optical flat 64 is laterally displaced with respect to the axis of reception because of the refractive properties of the glass. The amount of lateral displacement of an emerging image is determined by the index of refraction of the glass, the thickness of the glass, and the angle of the incident ray of light. A mathematical analysis of the operation of the canted optical flat 64 follows to provide a better understanding of the present invention.

The general solution of a ray through an optical flat is given by the equation:

$$d_2x = d_1y + R(d_1n_2 - d_2n_1) \quad (9.1)$$
$$d_3x = d_1z + R(d_1n_3 - d_3n_1) \quad (9.2)$$
$$d_3y = d_2z + R(d_2n_3 - d_3n_2) \quad (9.3)$$

where $$R = T(1 - \cos \Phi/n' \cos \Phi')$$

and $T$ = thickness of the optical flat,
$\Phi$ = incidence angle of the light ray,
$\Phi'$ = angle of the refracted ray,
$d_{1-3}$ = direction cosines of the incident and the emerging ray,
$n_{1-3}$ = direction cosines of a line which is normal to the canted flat,
$n'$ = index of refraction of the glass.

The equations define the vector of the ray emerging from the canted optical flat as illustrated in FIG. 3a.

The angle of incidence of the ray may be defined by the direction cosines of the incident ray with respect to a line which is normal to the optical flat. The angle of refraction and angle of incidence are related by Snell's law. The equations defining these relations are:

$$\cos \Phi = n_1d_1 = n_2d_2 + n_3d_3 \quad (10.1)$$

and $$n' \sin \Phi' = \sin \Phi$$

The above equations will now be used to show the effect of the optical flat on an image of a point object. Referring now to FIG. 3c, a point object 76 is illustrated providing a light image which is transmitted through a spherical lens 78. The spherical lens 78 provides a cone of light rays. To establish a reference to illustrate the effect of the canted optical flat 64, the cone of light rays are shown converging at a reference point image which would be the result if no optical flat 64 were interposed between the lens 78 and the point of convergence of the image. That point will be considered as the origin of the reference system for the following discussion. With reference to FIG. 3b, the direction cosines of a ray in the reference cone are:

$$d_1 = \Phi \cos Y, \, d_2 = \Phi \sin Y, \text{ and } d_3 = 1 \quad (10.2)$$

where $\Phi$ is the angle between a selected ray and the optical axis.

Consider now an optical flat 64 (FIG. 3c) positioned between the origin of the reference system and the lens 78 which is canted at an angle of $\Psi$ with respect to the optical axis 23. The direction cosines of a line normal to the flat are:

$$n_1 = \Psi \cos \chi, \, n_2 = \Psi \sin \chi \text{ and } n_3 = 1 \quad (11.1)$$

where $\chi$ is the angle between the radial component of the line normal to the flat and the x-axis. Substituting these direction cosines into the equation 9.1-3, one obtains an equation defining a cone having its apex at the following coordinates:

$$\Delta y = -\Psi \sin \chi \, T(n'-1)/n' \quad (11.2)$$
$$\Delta x = -\Psi \cos \chi \, T(n'-1)/n' \quad (11.3)$$

and $$\Delta z = -T(n'-1)/n' \quad (11.4)$$

The above equations show that the paraxial rays from the object are all brought to a point but the point is shifted in all three directions with respect to the origin of the reference system. Radially, this point is shifted an amount:

$$r = (\Delta x^2 + \Delta y^2)^{1/2} = \Psi T(n'-1)/n' \quad (11.5)$$

If, for example, the cant of the optical flat 64 is held constant but the direction of the cant is changed by rotating or nutating the flat, the point will maintain the same radial shift. However, by virtue of the rotation of the direction of cant, the point will inscribe a circle having a radius $r$ as illustrated in FIG. 3c.

As an example of the practical application of the above equations, a system for providing a lateral image displacement of 20 microns using an optical flat having a thickness of 10 millimeters and an index of refraction of $n'=1.5$ will be considered. The above equation can be rearranged to give the required cant angle $\Psi$ of the flat.

$$\Psi = r \, n'/T(n'-1) = 20 \times \, ^{-3} \times 1.5/10(1.5-1) \quad (11.6)$$
$$\Psi = 6 \times 10^{-3} \text{ radians}$$

In addition to the lateral displacement of 20 microns, the image is also shifted along the optical axis 23 by an amount $\Delta z$. This is given by the equation 11.4 as:

$$\Delta z = -10(1.5-1)/1.5 = B13.333 \text{ millimeters}$$

It will be noted that the shift is constant for the paraxial condition and is only dependent on the physical characteristics and cant of the optical flat. However, this simple relationship does not exist when larger incident angles are encountered.

It has been found that the refractive properties of a flat causes a point to become somewhat astigmatic. Moreover, astigmatism increases with the angle of the incident rays. Furthermore, the greatest astigmatism occurs along the optical axis z. From studies made with a canted optical flat and an Air Force test pattern, the astigmatism was found to be within tolerable limits for the satisfactory operation of an optical correlator.

In view of the foregoing, it will be appreciated that an image transmitted through a canted optical flat will be laterally displaced in accord with the angle of cant. Moreover, an image transmitted through a canted optical flat will be displaced by changing the direction of cant. If the angle of cant is fixed and the optical flat is rotated as shown in FIG. 2, the image will be displaced in a circular pattern as shown in FIG. 3a. In some cases, it may be advantageous to both change the angle of cant $\Psi$ and the direction of cant $\chi$ simultaneously or in sequence to provide a modified image displacement pattern to suit a particular purpose.

Measuring Image Misalignment Using the Optical/Electronic Correlating System 10 of FIG. 1

A typical plot of a two-dimensional correlation function of a pair of stereo images is shown in FIG. 4. In essence, the plot of FIG. 4 shows that the intensity of the output signal of an image-image coherent optical correlator increases as $x$ and $y$ image misalignment decreases. The $x$ and $y$ derivatives of the two-dimensional correlation function are also shown adjacent the correlation function on their respective axis. On examination, it will be appreciated that these derivatives have the functional properties that make them suitable signals for controlling image alignment in an automatic stereo compilation system. Accordingly, the $x$ and $y$ derivatives of the two-dimensional correlation function are labeled $\xi_{xo}$ and $\xi_{yo}$ respectively. The generation of these signals is explained hereinafter with reference to FIG. 15. However, reference to FIG. 4 shows that these signals are representative of correlation of the two stereo images.

More particularly, when an image is misaligned in the $-\Delta x$ direction, the error signal is positive. Accordingly, the error signal has the appropriate sign to operate a servomechanism to drive the image in the positive $x$ direction until it reaches perfect alignment, at which point the error signal becomes zero terminating the drive of the servomechanism. The process is reversed as the image is misaligned in the $+\Delta x$ direction. The $y$ derivative has the same properties. The servomechanism is of a type known in the art and moves either diapositive 24 or diapositive 32. This operation is known to those skilled in the art as evidenced by U.S. Pat. No. 3,267,286. U.S. Pat. No. 3,015,988 also shows details of stereoplotters useful in the inventive system.

With reference to FIG. 1, the relationship between the circular image displacement provided by the image-displacing device 16 and the correlation function of FIG. 4 will be considered. Lenses 26 and 30 provide a filtered light image representative of an inverted reconstruction of the illuminated imagery on a first stereo diapositive 24. This light image is received by the image-displacing device 16 and transmitted therethrough so as to be projected on the second stereo diapositive 32. By virtue of the operation of the image-displacing device 16, the projected image is displaced with respect to the second stereo diapositive 32 in a circular pattern. Two representative positions of the images resulting from the circular displacement pattern are indicated on the stereo diapositive 32 by the dotted image outlines.

The light signal transmitted through the second stereo diapositive 32 is modified to form a light signal representative of the product of the filtered illuminated imagery on the first stereo diapositive 24 and the unfiltered imagery on the second stereo diapositive 32. This product signal contains a correlation signal which may be isolated by transmission of the product signal through a spherical output lens 38, and thereafter, by filtering out the signal of low spatial frequency by a pinhole aperture plate 40. The light signal transmitted through the pinhole aperture represents the correlation signal $R$ and is detected by the photocell 42 to provide an electrical signal representative thereof.

The continuous movement of the light signal representative of the illuminated imagery on the first stereo diapositive 24 with respect to the imagery on the second stereo diapositive 32 provided by the image-displacing device 16 results in variations in the output signal detected by the photocell 42 in accordance with that movement. The significance of this variation will now be discussed in detail.

Consider the following exponential two-dimensional correlation function as shown in FIG. 4:

$$R(\Delta x, \Delta y) = e^{-\alpha(\Delta x^2 + \Delta y^2)}. \quad (14.1)$$

The terms $\Delta x$ and $\Delta y$ represent image misalignment in the $x$ and $y$ directions, respectively, (as opposed to alignment error signals $\xi_x$ and $\xi_y$) and the term $\alpha$ is a function of the spatial bandwidth of the detail in the imagery. The $x$ and $y$ derivatives of this function are:

$$d[R(\Delta x, \Delta y)]/dx = -2\alpha\Delta x \, e^{-\alpha(\Delta x^2 + \Delta y^2)} \quad (14.2)$$

and $$d[R(\Delta x, \Delta y)]/dy = -2\alpha\Delta y \, e^{-\alpha(\Delta x^2 + \Delta y^2)} \quad (14.3)$$

The circular path imparted to the illuminated imagery on the first stereo diapositive 24 by the image displacing device 16 may be defined by the following equation:

$$\Delta x' = r \cos(\omega t) \quad (14.4)$$
$$\Delta y' = r \sin(\omega t) \quad (14.5)$$

where $r^2 = (\Delta x')^2 + (\Delta y')^2$,
$\omega$ = angular velocity of scanner,
$t$ = time.

For this motion, the resulting correlation function can be written as:

$$R(\Delta x, \Delta y, t) = e^{-\alpha[(\Delta x + x')^2 + (\Delta y + \Delta y')^2]}$$
$$= e^{-\alpha[(\Delta x + r\cos(\omega t))^2 + (\Delta y + r\sin(\omega t))^2]}$$
$$= e^{-\alpha[\Delta r^2 + r^2 + 2r\Delta x \cos(\omega t) + 2r\Delta y \sin(\omega t)]} \quad (15.1)$$

By assuming that the image displacement is small compared to the average width of the detail in the imagery, the latter equation can be expanded in a power series in which only the first order terms are significant. The resulting equation is:

$$R(\Delta x, \Delta y, t) =$$
$$(1 - 2\alpha r\Delta x \cos(\omega t) - 2\alpha r\Delta y \sin(\omega t)) \cdot e^{-\alpha(r^2 + r^2)} \quad (15.2)$$

Inspection of the terms on the right-hand side of the above equation shows that the correlator output has two components: (1) a constant term, and (2) a fluctuating signal composed of sine and cosine terms.

The fluctuating part of the correlator output is of particular interest. When the correlator output is multiplied by a sine or a cosine wave synchronized with a circular motion of the scanner and then averaged, one obtains the following results:

$$\xi_{xo} = \overline{\cos(\omega t) R(\Delta x, \Delta y, t)} = -\alpha r\Delta x e^{-\alpha(\Delta x^2 + \Delta y^2 + r^2)} \quad (15.3)$$

and $$\xi_{yo} = \overline{\sin(\omega t) R(\Delta x, \Delta y, t)} = -\alpha r\Delta y e^{-\alpha(\Delta x^2 + \Delta y^2 + r^2)} \quad (15.4)$$

where the bar over the terms in the bracket is used to indicate the time averaging process. These equations show that two constant terms result from the correlation process. A comparison with the directional derivatives derived earlier, equations 14.2–3, demonstrate that they are equal within the constant factor. Using this result, equations 15.3–4 can be rewritten to express this relation, that is, $$\xi_{xo} = K \, d \, R(\Delta x, \Delta y)/dx \quad (15.5)$$

and $$\xi_{yo} = K \, d \, R(\Delta x, \Delta y)/dy \quad (15.6)$$

The mathematics presented above may be graphically visualized with reference to FIGS. 4–6. A path A is shown on the two-dimensional correlation function of FIG. 4 indicating the output level of the correlator when the first image is circularly displaced at a constant radius $r$ from perfect alignment. This displacement can be better seen by referring to the projection A' of path A on the base. When the images are thusly aligned, the intensity level of the correlator output remains constant as illustrated in FIG. 5a. Under this condition, it is known that imagery on the first stereo diapositive 24, which corresponds to the imagery on the second stereo diapositive 32 at the optical axis 23, is positioned at the origin 0 of the circular displacement. Accordingly, corresponding imagery on the diapositives 24 and 32 has been identified and located.

For the purposes of this application, the diapositives 24 and 32 are considered to be aligned if the imagery on the second stereo diapositive 32 at the optical axis 23 corresponds to the imagery on the first stereo diapositive at the origin 0 of the circular displacement. Since the origin 0 of the circular displacement is located on the optical axis 23, the corresponding images are both located on the optical axis 23.

A second plot B is shown in FIG. 4 illustrating a condition of image misalignment. As can be seen from the projection B' on the base, the images are misaligned in the $+x$ direction. It can be seen from FIG. 4 that the intensity level of the correlator output signal varies as the image is displaced in a circular path. The correlator output signal is depicted in FIG. 5b. The phase and amplitude variation of the correlator output signal is representative of the direction and amount of image misalignment, respectively. Preferably, the direction and amount of image misalignment are given as $x$ and $y$ error signals $\xi_x$ and $\xi_y$ for convenient operation of a servomechanism to return the images to an aligned condition. That is, the $\xi_x$ and $\xi_y$ signals drive the servomechanism which moves either image 24 or image 32 in the $x$-$y$ plane. This motion makes the error signals go to zero.

According to the equation 15.3, the correlator output signal is multiplied by a cosine wave synchronized with the circular motion of the image to provide an $x$ error signal $\xi_x$. This operation is depicted in FIG. 5 in which FIG. 5c illustrates a cosine signal and FIG. 5d illustrates the results of a multiplication between the cosine signal of FIG. 5c and the correlator output signals of FIGS. 5a and 5b, respectively. Particularly, multiplication by the constant signal of FIG. 5a representing no image misalignment provides a cosine signal centered about the horizontal axis. The average value of this cosine signal is zero which, therefore, represents perfect alignment of the imagery of the stereo diapositives 24 and 32. On the other hand, the multiplication of the misalignment output signal as shown in FIG. 5b and the cosine signal of FIG. 5c provides an oscillating signal which is offset from the zero axis in the negative direction to provide a negative average value $\bar{b}$. The value $\bar{b}$ represents the misalignment error signal $\xi_x$ in the $x$ direction previously explained to have the desirable error signal characteristics.

To obtain a $y$ misalignment signal $\xi_y$, the correlator output signal is multiplied by a sine wave synchronized with the circular motion of the image. The resulting signal is then averaged in the manner described above to yield the $y$ error signal $\xi_y$.

With reference to FIG. 6, the error signals obtained through the above procedure will be considered in additional detail. FIG. 6a illustrates two superimposed images which are perfectly aligned. Since the images are in perfect alignment, the error signals (represented as small circles) are zero. The dashed curves indicate the progress of the error signals if a misalignment should occur in either the $x$ or $y$ direction.

In FIG. 6b, the superimposed images are misaligned in the $x$ direction only. Accordingly, the upper curve shows $y$ error signal $\xi_y$ equal to zero and the lower curve shows some finite $x$ error signal $\xi_x$. From the upper dashed curve showing the progress of an error signal for a $y$ misalignment when an $x$ misalignment already exists, it will be appreciated that $y$ error signals $\xi_y$ are somewhat reduced in amplitude by virtue of the $x$ misalignment. In other words, the error signals $\xi_x$ and $\xi_y$ are mutually related such that an error in one direction causes a reduction in the detection sensitivity of the apparatus for errors in the other direction. Importantly, the error curve in the $y$ direction maintains an appropriate shape to properly drive a servomechanism regardless of the reduction in sensitivity.

In FIG. 6c, two superimposed images are shown which are misaligned in the $y$ direction. As can be seen from the figure, a $y$ error signal $\xi_y$ has resulted. It will also be apparent from the lower dashed curve that the sensitivity in the $x$ direction has been reduced. However, the curve retains its characteristics as a suitable error signal for a servomechanism.

In FIG. 6d a pair of superimposed images are illustrated which are misaligned in both the $x$ and $y$ directions. Accordingly, the coherent optical/electronic correlating system 10 of FIG. 1 has provided both $x$ and $y$ error signals. It should be noted that the error signals of this example are of relatively smaller than previously illustrated because of the interrelationship of the errors. Of course, this interrelationship may be compensated for by adjusting the error signal in one direction according to this error in the other direction. However, compensation of that nature is not necessary when a servomechanism is used since the error signals will tend to return the images to perfect alignment regardless of the reduction in sensitivity of the signals.

Measuring Relative Image Distortion Using the Optical/Electronic Correlating System of Figure 1

Stereo images are exactly alike only if the terrain photographed is flat and perfect vertical photographs are used. Perfect vertical photographs are provided by cameras located in the same plane and oriented perpendicularly with respect to the plane of the object being photographed. Terrain slope produces relative image distortions such as skewing and elongation of the photographs which prevent optimum image matching. Accordingly, the identification and location of corresponding imagery is adversely effected. Prior to an explanation of the method and apparatus of this invention for detecting relative image distortions, the origin and nature of these distortions will be considered.

With reference now to FIG. 9, a terrain model 80 is shown having a diamond pattern. Consider now two cameras positioned laterally of the terrain model 80 which provide perfect vertical photographs. The cameras would provide photographic images 82 and 84 which are identical. Since the photographic images are perfectly identical, a strong correlation signal is provided which is depicted to the right of the photographs 82 and 84.

Consider now a case in which the terrain photographed has a slope in the $x$ direction as shown in FIG. 7. As can be seen in the figure, the base projection AB of the terrain model 80 from camera 1 is larger than the base projection A'B' of camera 2. In essence, these projections represent the relative sizes of imagery projected on the film in the cameras. Accordingly, it will be appreciated that the $x$ dimension of the image of the terrain model 80 as provided by camera 1 will be larger than the corresponding dimension of the image of the terrain model image 80 provided by camera 2. In other words, there will be a relative $x$ elongation of the image provided by camera 1. This relative $x$ elongation caused by the $x$ slope condition may be seen with reference to the corresponding photographic images 86 and 88 of FIG. 9. As a result of the $x$ elongation, the images 86 and 88 are quite unalike, and therefore, will provide a relatively poor error signal in the event of image misalignment as depicted to the lower right of the images 86 and 88.

A case of terrain slope in the $y$ direction is illustrated in FIGS. 8a and 8b. The $y$ slope causes skewing of the images in the $x$ direction as can be seen in the corresponding photographic images 90 and 92 of FIG. 9. It should be noted that the $x$ skewing for each image is in opposite directions. As a result of the skewing, a poor error signal is obtained as depicted to the right of the images 90 and 92.

A combination of $x$ and $y$ slope causes combined $x$ skewing and relative $x$ elongation of the images as shown as photographs 94 and 96 of FIG. 9 which will result in an extremely poor error signal upon misalignment as depicted to the upper right of the photographs.

Even though the images may be skewed or elongated in the $x$ direction by terrain slope, there is no $y$ distortion caused by terrain slope because of the nature of the stereo process. This may be seen in the side view of the stereo process shown in FIG. 8b. In the figure, cameras 1 and 2 are overlapped, and accordingly, only camera 2 is illustrated. From the figure, it will be appreciated that the angles in the $y$ direction which are seen by the cameras are the same. Accordingly, the projections in the $y$ direction on the film of each camera are of equal dimension. Therefore, it will be appreciated that there is no relative $y$ elongation due to terrain slope. Camera orientation, however, may cause $y$ elongation.

From the above, it will be appreciated that terrain slope may cause relative image elongation in the $x$ direction, relative image skewing in the $x$ direction, or both. Furthermore, poor image correlation results from these relative image distortions causing reduced error signals when image misalignment exists. Accordingly, it is desirable to detect and correct the distortions to obtain optimum image correlation.

The method and apparatus of this invention for detecting relative image distortions will now be considered. To facilitate the visualization of the methods of this invention, special cases of $y$ slope and $x$ slope are given such that one of the two stereo photographs is characterized by square forms.

In the case of $x$ slope, camera 2 is positioned over a terrain model 81 as shown in FIG. 10a. The terrain model 81 has an elongated form in the $x$ direction as shown in FIG. 10b to provide a square form image illustrated as photographic image 98 in FIG. 11. Camera 1 is laterally offset to the left to produce an image which is elongated in the $x$ direction illustrated as photographic image 100 in FIG. 11.

Superimposition of the photographic images 98 and 100 provide the result shown in FIG. 11a. In FIG. 11a, the superimposed images are separated into four quarters for reasons which will become apparent below. Although the two superimposed photographs are perfectly aligned overall, an examination of each quarter of the two photographs will demonstrate misalignments which are significant in determining relative image distortions. It should be understood that images 98 and 100 are the imagery under examination by the optical correlator. That is, image 98 comprises the illuminated portion of the first stereo diapositive 24 and image 100 is the illuminated corresponding imagery of the second stereo diapositive 32.

Considering now the upper left quadrant $b$ shown in enlarged form as FIG. 11b, it can be seen that the left edge of the photographic image 100 extends a distance $-x_b$ beyond the corresponding edge of the photographic image 98. As a result, independent correlation of the two images of the upper left-hand quadrant will provide an error signal $+\xi_{xb}$ which is related to $-x_b$. In other words, a shift of photographic image 98 according to the error signal $+\xi_{xb}$ would result in maximum correlation.

Similarly, for the lower left quadrant $c$ shown in enlarged form in FIG. 11c, the left edge of the photographic image 100 extends a distance $-x_c$ beyond the corresponding edge of the photographic image 98. Accordingly, independent correlation of that quadrant would provide a related $x$ error signal $+\xi_{xc}$.

In turn, the lower right quadrant $d$, shown in enlarged form in FIG. 11$d$, exhibits a displacement of $+x_d$ between corresponding right edges; and the upper right quadrant $e$, shown in enlarged form in FIG. 11$e$, exhibits a displacement of $+x_e$ between corresponding right edges. As a result, independent correlation of these quadrants would provide related $x$ error signals $-\xi_{xd}$ and $-\xi_{xe}$, respectively.

If the $x$ error signals of each quadrant are summed as shown in FIG. 11$f$, the misalignments would cancel producing a net signal of zero because the photographic images 98 and 100 are aligned overall. However, if the $x$ error signals of the two left quadrants are summed and the $x$ error signals of the two right quadrants are subtracted, a net signal would result which is representative of $x$ elongation or scale change such as that which is caused by $x$ slope.

A multiple-aperture output apparatus 20 for individually correlating each of the four quadrants ($b$ through $e$) is shown in FIG. 12. The multiple-aperture output apparatus 20 includes a quadrature lens 102, a blocking plate 104 positioned at the back focal plane of the quadrature lens 102 having a pinhole aperture aligned with each quadrant of the lens 102, and a detector section 106 having a detector positioned behind each of the four pinhole apertures for detecting the intensity of light transmitted therethrough. A four-conductor cable 50 is provided for transmitting the output signals of each of the detectors of the detector section 106 to the signal processor 14.

In operation, the quadrature lens 102 separates the product signal reflected from the beam splitter 34 into the four quarters or quadrants as illustrated in FIG. 11$a$. As well as separating the image into four quarters, the quadrature lens 102 provides a Fourier transform of each of the four product signal quarters. Each product signal quarter contains a correlation signal for that quadrant on its respective optical axis. Each correlation signal passes through the respective pinhole aperture of the aperture plate 104 and is detected by the corresponding photocell of the detecting section 106 to yield an electrical signal representative of the amount of correlation of the illuminated images in that quadrant.

From the above, it will be appreciated that the multiapertured output section 20 divides a received product signal into four quarters which are independently and simultaneously correlated. Image misalignment for each quarter may be determined by multiplication of the correlation signals by sine and cosine functions in synchronism with the rotating optical flat as previously explained.

If the above described technique for detecting relative image distortions is to yield meaningful results, it is important that the overall images are first aligned, for example, by the previously explained process using the rotating optical flat.

After the images have been aligned overall by use of servomechanisms or other types of alignment systems known to those skilled in the art, and the misalignment signals for each quadrant have been obtained, $x$ elongation may be detected according to the method described in connection with FIG. 11. A signal processor 14 for electronically accomplishing that function is described in detail hereinafter.

The multiaperture output section 20 is also used to detect relative image skewing in the $x$ direction such as that which would be caused by terrain slope in the $y$ direction. To more clearly illustrate the operation of the multiaperture output section 20 in this manner, a terrain model 83 is utilized as shown in FIG. 13$b$. The longer dimension of the terrain model 83 is positioned along the $y$ direction. In this manner, a camera (2) positioned vertically above the terrain model 81 as shown in FIG. 3$a$ will yield a photographic image 108 (FIG. 14) characterized by square forms to facilitate a visual appreciation of the following method of this invention for detecting $x$ skewing. Camera 1 is laterally offset from the terrain model 80 thereby providing a photographic image 110 (FIG. 14) exhibiting skewing due to the $y$ slope of the terrain model 81.

The photographic images 108 and 110 are shown superimposed in FIG. 14$a$. Due to the $x$ skewing of photographic image 110, it can be seen that poor image registration results which would reduce the sensitivity of the correlator.

As in the previous example, the product signal representing the superimposed image is divided into four quarters or quadrants. With reference to FIG. 14$b$ in which the upper left quadrant is illustrated in enlarged form, it can be seen that the edge of the photographic image 110 is extended a distance $+x_b$ to the right of the corresponding edge of the photographic image 108. As previously explained, the distance $+x_b$ is related to the error signal $-\xi_{xb}$ caused by the misalignment of the images in the $x$ direction.

With reference to FIG. 14$c$ in which the lower left quadrant is illustrated in enlarged form, it can be seen that the left edge of the photographic image 110 extends a distance $-x_c$ from the corresponding edge of the photographic image 108 resulting in an error signal for that quadrant of $+\xi_{xc}$. In turn, in the lower right quadrant shown in enlarged form in FIG. 14$d$, it can be seen that the right edge of photographic image 110 is displaced a distance $+x_d$ from the corresponding edge of the photographic image 108 resulting in an $x$ error signal $-\xi_{xd}$ for that quadrant. Finally, in the upper right quadrant shown in FIG. 14$e$, it can be seen that the right edge of the photographic image 110 extends a distance $+x_e$ from the corresponding edge of the photographic image 108 resulting in an $x$ error signal $-\xi_{xe}$ for that quadrant.

If the error signals of the four quadrants are summed as shown in FIG. 14$f$, a zero net signal will result since the overall images are in alignment. However, if the $x$ error signals of the two upper quadrants are summed, and the $x$ error signals of the two lower quadrants are subtracted from that sum, a net signal will result which is representative of $x$ skewing, for example, that which may be caused by terrain having $y$ slope.

At times, there may be an overall scale difference between the two stereo photographs. For example, that condition would occur if the photographs were taken at different altitudes. It will be appreciated that an overall scale change provides relative enlargement of one of the images, i.e., elongation of one image with respect to the other in all directions.

With reference now to the measurement of $x$ elongation $\xi_{xx}$ explained previously, it is apparent with $x$ elongation due to an overall scale change would be detected by that method. It is further apparent that a method for detecting $y$ elongation $\xi_{yy}$ should be provided if optimum correlation is to be achieved.

Deletion of $y$ elongation $\xi_{yy}$ may be readily accomplished by using the multiaperture output 20 of the optical/electronic correlating system 10 of FIG. 1. Particularly, the $y$ misalignment signals $\xi_{y,(b \; through \; e)}$ are obtained for each quadrant in the manner described previously. The $y$ error signals $\xi_y$ for the upper two quadrants $b$ and $e$ are summed, and the $y$ error signals $\xi_y$ for the lower two quadrants $c$ and $d$ are subtracted from the sum to yield a signal representative of $y$ elongation.

It is also desirable to detect $y$ skewing $\xi_{yx}$. This may be readily accomplished using the multiaperture output system 20 by determining the $y$ misalignment value $\xi_y$ for each quadrant $b$ through $e$. The $y$ error signals $\xi_y$ for the right quadrants $d$ and $e$ are summed, and the $y$ error signals $\xi_y$ for the left two quadrants $b$ and $c$ are subtracted from the sum to yield a net signal representative of $y$ skewing $\xi_{yx}$.

From the above, it will be appreciated that some of the relative image distortions may be the result of more than one image or camera condition. In general, information as to the cause of the image distortion is not needed. Rather, the relative image distortions are detected to provide means for eliminating or compensating for the distortions regardless of their cause. In this manner, optimum correlation of two stereo images may be achieved to obtain the maximum accuracy in identifying and locating corresponding images in the parallax measuring process.

Description and Operation of the Electronic Signal Processor 14

Figure 15:
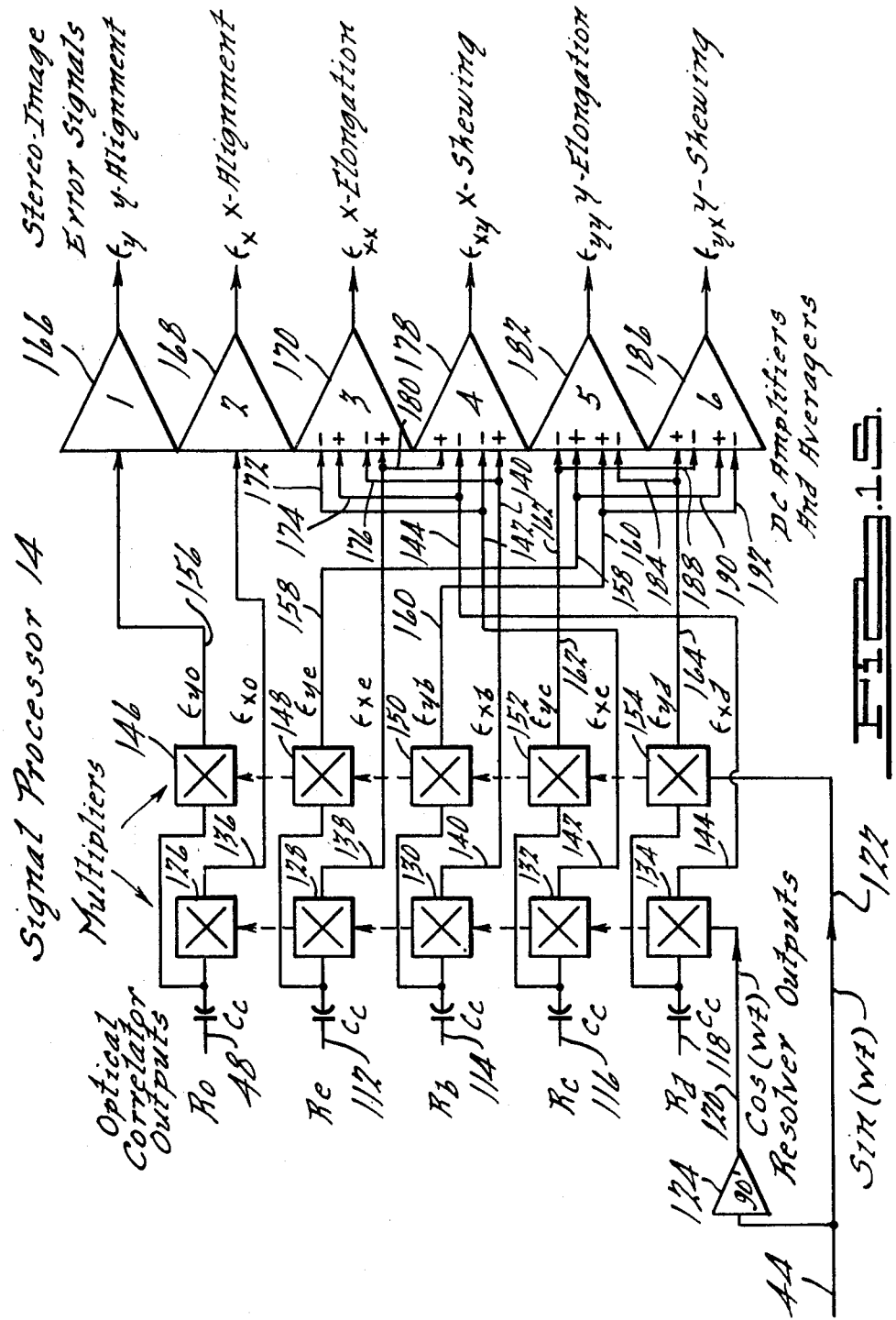
FIG. 15 is a circuit diagram of the signal processor of FIG. 1 for providing x and y misalignment signals and relative image distortion signals.

The signal processor 14, shown in detail in FIG. 15, electronically implements the calculating processes outlined in the previous section so as to detect relative image distortions. In essence, the signal processor 14 is an electronic computer consisting primarily of multipliers and summing DC amplifiers.

The signal processor 14 receives the output of photocell 42 on line 48 and the outputs of the four photocells of the detector section 106 on lines 112–118 which comprise cable 50. The output of photocell 42 is the intensity distribution correlation signal shown in FIG. 4 and is represented by $R_o$ in FIG. 15. It will be appreciated that the signals on these lines represent the correlation signals R which vary due to the circular image displacement provided by the image displacing device 16. $R_o$ represents the correlation signals for the entire image whereas signals $R_e$, $R_b$, $R_c$, and $R_d$ represent the correlation signals for the image quadrants correspondingly labeled in FIGS. 11 and 14. Each input line is provided with a coupling capacitor $C_c$ to pass only the alternating portion of the correlation signals.

The signal processor 14 also receives a cosine signal on line 120 which is in synchronism with the circular image displacement, and a sine signal on line 122 which also is in synchronism with the circular image displacement. For example, the sine signal may be obtained directly from the resolver by connecting the resolver output line 44 to the line 122, and the cosine signal may be obtained by inserting a 90° phase shifter 124 between the resolver output line 44 and the line 120 as shown in FIG. 15; or the sine and cosine signals may be obtained directly from a resolver adapted for that purpose.

A plurality of first multipliers 126 thru 134 are connected to the correlation signal input lines 48 and 112–118, respectively, and to the line 120 providing the cosine signal. The multipliers 126–134 provide output signals on lines 136–144 representative of the product of the respective correlation signal and the cosine signal. As explained previously, these products represent the x error signals $\xi_x$ of the images, i.e., the overall images and the quadrant images. In other words, the signal $\xi_x$ represents the x parallax of the images.

A plurality of second multipliers 146–154 also are connected to the correlation signal input lines 48 and 112–118, respectively. However, the second multipliers 146–154 are connected to line 122 providing the sine signal. The multipliers 146–154 provide signals on lines 156–164 representative of the product of the correlation signal and the sine signal. The product of the signals represent the y error signals $\xi_y$ of the images. Accordingly, they are representative of y parallax.

A total of six relative image distortion signals are generated by the signal processor 14. These error signals are:

1. $\xi_{xo}$—x misalignment
2. $\xi_{yo}$—y misalignment
3. $\xi_{xx}$—x elongation or scale change
4. $\xi_{xy}$—x skewing
5. $\xi_{yy}$—y elongation of scale change
6. $\xi_{yx}$—y skewing The alignment error signals $\xi_{xo}$ and $\xi_{yo}$ measure the misalignment of the imagery on the second stereo diapositive 32 which corresponds to the illuminated imagery of the first stereo diapositive 24. Therefore, $\xi_{xo}$ and $\xi_{yo}$ represent the misalignment of the overall imagery under examination by the optical correlator, i.e., the illuminated imagery. These signals are obtained directly from the multipliers 126 and 146. To provide signals of the appropriate amplitude, the alignment error signals $\xi_{yo}$ and $\xi_{xo}$ are amplified by the amplifiers 166 and 168, respectively.

The x elongation signal $\xi_{xx}$ is determined by the process:

$$\xi_{xx}=\overline{(\xi_{xe}-\xi_{xb}-\xi_{xc}+\xi_{xd})} \qquad (28.1)$$

This operation is accomplished by a summing/averaging amplifier 170. The overline indicates that an average value of the above terms is taken by the amplifier 120. A line 172 is provided connecting a subtracting terminal of the amplifier 170 to the output line 142 of the amplifier 132 to introduce the c quadrant x error signal $\xi_{xc}$ to the amplifier. A line 174 is provided connecting a summing terminal of the amplifier 170 to line 144 from the multiplier 134 to introduce the d quadrant x error signal $\xi_{xd}$ to the amplifier 170. A line 176 is provided connecting a subtracting terminal of the amplifier 170 to line 140 from multiplier 130 to introduce the b quadrant x error signal $\xi_{xb}$ to the amplifier 170. Finally, the line 138 from the multiplier 128 is connected to a summing terminal of the amplifier 170 to introduce the e quadrant x error signal $\xi_{xe}$ to the amplifier 170. The amplifier 170 performs the indicated operations to provide a signal representative of x elongation or scale change $\xi_{xx}$. These operations are illustrated graphically in connection with FIG. 11. It should be understood that relative image reduction or foreshortening will appear as a negative elongation.

A signal representative of x skewing $\xi_{xy}$ is obtained by amplifier 178 according to the relationship:

$$\xi_{xy}=\overline{(\xi_{xe}+\xi_{xb}-\xi_{xc}-\xi_{xd})} \qquad (29.1)$$

Again, the overline indicates that the average value of the above terms is taken by the amplifier 178. A line 180 is provided connecting a summation terminal of amplifier 178 to line 138 from the multiplier 128 to introduce the e quadrant x error signal $\xi_{xe}$ to the amplifier 178. A line 144 from the multiplier 134 is connected to a subtracting terminal of the amplifier 178 so as to introduce the d quadrant x error signal $\xi_{xd}$ to the amplifier 178. Line 142 from the multiplier 132 is connected to a subtracting terminal of amplifier 178 so as to introduce the c quadrant x error signal $\xi_{xc}$ to the amplifier 178. A line 140 from the multiplier 130 is connected to a summation terminal of the amplifier 178 for introducing the b quadrant x error signal $\xi_{xb}$ to the amplifier 178. The amplifier 178 performs the indicated additions and subtractions to provide an output signal representative of x skewing $\xi_{xy}$. These operations are illustrated graphically in FIG. 14.

An amplifier 182 is provided for detecting y elongation according to the relationship:

$$\xi_{yy}=\overline{(\xi_{ye}+\xi_{yb}-\xi_{yc}-\xi_{yd})} \qquad (29.2)$$

The line 162 from multiplier 152 is connected to a subtracting terminal of the amplifier 182 so as to introduce the c quadrant y error signal $\xi_{yc}$ to the amplifier 182. Line 158 from the multiplier 148 is connected to a summing terminal of the amplifier 182 so as to introduce the e quadrant y error signal $\xi_{ye}$ to the amplifier 182. Line 160 from the multiplier 150 is connected to a summing terminal of the amplifier 182 so as to introduce the b quadrant y error signal $\xi_{yb}$ to the amplifier 182. A line 184 is provided connecting a subtracting terminal of the amplifier 182 to the line 164 from the multiplier 154 so as to introduce the d quadrant y error signal $\xi_{yd}$ to the amplifier 182. The amplifier 182 performs the foregoing additions and subtractions to provide a signal representative of y elongation $\xi_{yy}$.

An amplifier 186 is provided for obtaining a signal representative of y skewing $\xi_{yx}$ according to the relationship:

$$\xi_{yx}=\overline{(\xi_{ye}-\xi_{yb}-\xi_{yc}+\xi_{yd})} \qquad (30.1)$$

More particularly, the line 164 from the multiplier 154 is connected to a summing terminal of the amplifier 186 so as to introduce the d quadrant y error signal $\xi_{yd}$ to the amplifier 186. A line 188 is provided connecting a subtracting terminal of the amplifier 186 to line 162 from the multiplier 152 so as to introduce the c quadrant y error signal $\xi_{yc}$ to the amplifier 186. A line 190 is provided connecting a summing terminal of the amplifier 186 to line 158 from the multiplier 148 so as to introduce the e quadrant y error signal $\xi_{ye}$ to the amplifier 186. Finally, a line 192 is provided connecting a subtracting terminal of the amplifier 186 to line 160 from multiplier 150 to introduce the b quadrant y error signal $\xi_{yb}$ to the amplifier 186. The net result of the foregoing additions and subtractions is a signal representative of y skewing $\xi_{yx}$. It will be appreciated that y skewing $\xi_{yx}$ appears essentially as the illustrated x skewing $\xi_{xy}$ except that it is rotated 90° with respect to the xy coordinates. It will now be appreciated that the distortion signals which are the outputs of amplifiers 170, 178, 182, and 186 are used to correct the distortion and thereby increase the correlation signals.

Throughout this section, analog processing has been inferred. However, since only phase information is important in the error measurement scheme, it should be understood that binary logic and circuits accomplishing the above functions may be readily provided by one skilled in the art.

Description and Operation of the Optical/Electronic Correlating System 200 of FIG. 16

The optical/electronic correlating system 200 uses many of the components of the optical/electronic correlating system 10 of FIG. 1. For simplicity, like components are given like numbers. The correlating system 200 further includes an anamorphic image distortion correction system 202, an aperture zoom control 204, and a beam expander 206.

The anamorphic image distortion correction system 202 comprises three anamorphic lens units 208, 210 and 212, each containing an anamorphic lens which is rotatable by motors 214a, 214b, 214c in response to relative image distortion signals on a cable 216. An anamorphic lens provides different magnifications in each of two perpendicular directions. The lenses can be rotated to positions wherein the differential magnifications between the perpendicular directions are effectively cancelled, or may be rotated to positions which produce any of the relative image distortion characteristics described above, for example, $x$ or $y$ elongation/reduction and/or $x$ or $y$ skewing. Since these devices are known to the art, a detailed explanation of their operation will not be provided here. However, it should be understood that lenses 208, 210, and 212 receive the distortion signals defined by equations 28.1, 29.1, 29.2, and 30.1, which are generated as described with respect to FIG. 11.

As can be seen from FIG. 16, only the imagery of the first stereo diapositive 24 is transmitted through the anamorphic image distortion correction system 202. Accordingly, only the imagery on the first stereo diapositive is affected thereby. When relative image distortion is detected by the correlating system 200, appropriate signals are provided to the motors 214a, 214b, 214c so as to rotate the anamorphic lenses of unit 208–212 appropriately to cause skewing, elongation, or reduction of the imagery of the first stereo diapositive 24 such that the relative image distortion is eliminated. When the relative image distortion is eliminated, optimum correlation is achieved, and accordingly, the highest accuracy in identifying and locating corresponding imagery is obtained.

The aperture zoom control 204 of the correlating system 200 provides a variable beam width w so as to control the amount of imagery of the first stereo diapositive 24 which is illuminated, and consequently, which is correlated with the imagery on the second stereo diapositive 32. Accordingly, the signal on line 218 which actuates zone control 204 is a function of the output of photocell 42. It is preferred to operate the aperture zoom control 204 inversely in response to signals on line 218 representative of the amplitude of the correlation signal received by detector 42. In this manner, a constant loop gain of the system is maintained. In addition, the zoom lens conserves laser power and maintains a constant power level into the correlator.

The beam expander 206 aids in the efficient use of the quadrature lens and detector assembly 20 by increasing the size of the beam received by the quadrature lens 102. In this manner, more of the area of the quadrature lens is utilized, and consequently, the component of image distortion caused by the interfaces of the quadrants of the quadrature lens is reduced.

The correlating system 200 is further provided with an image positioning means 220 for the first stereo diapositive 24. The image positioning means 220 is indicated schematically since many devices are available for this purpose. Preferably, the image positioning means 220 responds to $x$ and $y$ misalignment signals $\xi_x$ and $\xi_y$ so as to provide accurate alignment of corresponding images. In view of the preceding discussion on the measurement of relative image distortion, it will be appreciated that the images must be aligned before relative image distortion is measured, a function which is conveniently provided by the positioning means 220.

In view of the foregoing description of this invention, it will now be appreciated that the present invention provides an advantageous method for aligning corresponding imagery in optical correlators and for detecting relative image distortions in such correlators. Moreover, the structure of this invention is relatively straightforward and extremely effective. Importantly, the optical correlator of this invention offers higher signals to noise ratios than the prior art electronic correlators used for the same purpose.

While I have described several preferred embodiments of the present invention, it should be understood that various changes, adaptions and modifications may be made therein without departing from the spirit of the invention and the scope of the appending claims.

Having thus described my invention, I claim:

1. A system for automatically aligning optical images individually present on a pair of transparencies comprising:
    means for providing a light image representative of the imagery of at least a portion of one of said transparencies;
    means for displacing said light image in a circular path with respect to the other of said transparencies to produce an output representative of the correlation of said images, said output varying in accordance with said circular path so that said output is proportional to misalignment of said images;
    means for providing a signal dependent upon said circular path;
    means for receiving said output and said signal dependent upon said circular path and producing control signals proportional to said misalignment with respect to two perpendicular axes;
    alignment means receiving said control signals to thereby align said images;
    means for producing distortion signals representative of the relative distortion of said optical images; and
    means for receiving said distortion signals and correcting for said distortion.

2. The system of claim 1 wherein said means for providing a signal dependent upon said circular path includes signal generator means, said signal generator means providing a sine signal as said signal representative of said circular path, said sine signal being in synchronism with said circular path, and wherein said means for receiving said output includes first means for multiplying said sine signal and said proportional output to provide said control signal, said control signal being representative of the misalignment of said images in a first direction.

3. The system of claim 1 wherein said signal generator means also provides a cosine signal as said signal representative of said circular path, said cosine signal being in synchronism with said circular path, and wherein said means for receiving said output includes second means for multiplying said cosine signal and said proportional output to provide said control signal, said control signal also being representative of the misalignment of said images in a second direction.

4. The system of claim 3 further including optical dividing means also receiving said output representative of the correlation of said images, said optical dividing means dividing said output into four quadrants so that misalignment in each of said quadrants affects said control signal.

5. The system of claim 4 wherein the input member of said optical dividing means is a quadrature lens assembly.

6. The system of claim 5 wherein said means for displacing light in a circular path includes an optical flat canted with respect to said circular path, and means for rotating said flat.

7. In a system for automatically aligning optical images individually present on a pair of transparencies, an optical system for providing a correlation signal representative of the degree of correlation of imagery on a pair of transparencies comprising:

means for providing a light image transmitted along a predetermined axis representative of the imagery on at least a portion of one of said transparencies;

a canted optical flat on said axis positioned for transmission of said light image therethrough to the other of said transparencies;

means for rotating said canted optical flat about said axis thereby displacing said image in a circular path with respect to the other of said transparencies to generate said correlation signal varying in accord with said rotation of said optical flat whereby misalignment of said optical images is indicated by variations of said correlation signal;

means for providing a signal dependent upon said circular path;

control signal generator means receiving said correlation signal and said signal dependent upon said circular path and generating a control signal dependent upon said correlation signal and said signal dependent upon said circular path;

alignment means receiving said control signal to thereby align said imagery; and distortion means for producing distortion signals representative of distortion of said imagery, said distortion means being responsive to said displaced image.

8. The system of claim 7 wherein said means for providing a signal dependent upon said circular path includes sine signal generator means so that said signal representative of said circular path includes a sine signal in synchronism with said circular path and wherein said signal generating means includes multiplying means for multiplying said sine signal and said correlation signal so that said control signal is representative of the misalignment of said images in a first direction.

9. The system of claim 8 wherein said means for providing a signal dependent upon said circular path includes cosine signal generator means so that said signal representative of said circular path includes a cosine signal in synchronism with said circular path and wherein said signal generating means includes second multiplying means for multiplying said cosine signal and said correlation signal to provide an error signal representative of the misalignment of said images in a second direction.

10. A system for optically indicating relative image distortion of the imagery on a pair of transparencies comprising:

optical means for providing a light product image representative of the product of the imagery on at least a portion of said transparencies;

means for dividing said light product image into a plurality of product image portions and producing correlation signal representative of the correlation of imagery of said transparencies for each of said image portions;

means for displacing said imagery with respect to one another to produce at least one signal proportional to said displacement;

signal processor means receiving said correlation signals and said signal proportional to said displacement for providing control signals;

said means for displacing including image distortion compensation means responsive to said control signals to maximize correlation of said imagery in response to said correlation signal.

11. The system of claim 10 further including lens means for providing a light image representative of the imagery on at least a portion of one of said transparencies; and wherein said means for displacing displaces the imagery on one of said transparencies in a circular path on the plane of the other of said transparencies.

12. The system of claim 11 wherein said means for displacing includes:

first means for providing a sine signal in synchronism with said circular path;

second means for providing a cosine signal in synchronism with said circular path;

said signal processor means receiving said sine and cosine signals as said signal proportional to said displacement, said signal processor means including multiplying means for multiplying said correlation signals with said sine and cosine signals to produce outputs individually representative of displacements along two perpendicular axes.

13. The system of claim 12 wherein said means for dividing includes:

means for dividing said product imagery into four quadrilaterally disposed product image portions, an upper left portion, an upper right portion, a lower left portion, and a lower right portion and for providing quadrature correlation signals representative of the degree of alignment of imagery corresponding to each of said product image portions;

and wherein said signal processor means includes;

means for providing a sum of said quadrature correlation signals representative of horizontal misalignment of said two left portions;

means for subtracting said quadrature correlation signals representative of horizontal misalignment of said two right portions from said sum thereby providing a net signal which is representative of $x$ elongation;

means for providing a sum of said quadrature correlation signals representative of vertical misalignment of said two upper portions; and means for subtracting said quadrature correlation signals representative of vertical misalignment of said two lower portions from said sum thereby providing a net signal which is representative of $y$ elongation.

14. A system for optically indicating relative image distortion of aligned corresponding imagery on a pair of transparencies comprising;

optical means providing a light product image representative of the product of the aligned corresponding imagery;

means for dividing said light product image into four quadrilaterally disposed product image portions, an upper left portion, an upper right portion, a lower left portion, and a lower right portion and for providing quadrature correlation signals representative of the degree of alignment of imagery corresponding to each of said product image portions;

means for cyclically displacing the imagery on one of said transparencies with respect to the other of said transparencies to produce a displacement proportional signal; and signal processor means receiving said quadrature correlation signals and said displacement proportional signal for providing an image distortion signal representative of the relative image distortion of said light product image.

15. The system of claim 14 wherein said signal processor means includes:

means for providing a sum of said quadrature correlation signals representative of horizontal misalignment of said two upper portions;

means for subtracting said quadrature correlation signals representative of the horizontal misalignment of said two lower portions from said sum thereby providing a net signal which is representative of $x$ skewing;

means for providing a sum of said quadrature correlation signals representative of vertical misalignment of said two right portions; and means for subtracting said quadrature correlation signals representative of vertical misalignment of said two left portions from said sum thereby providing a net signal which is representative of $y$ skewing.

16. A system for optically correlating the imagery on a pair of transparencies comprising:

optical means providing a light product image representative of the product of the imagery on at least a portion of said transparencies, said light product image including correlation signals representative of the correlation of said images;

lens means for dividing said light product image into a plurality of product image portions;

aperture means for each of said product image portions for transmitting only said correlation signals of said product image portions;

detector means for each of said aperture means responsive to said correlation signals for providing an output signal representative of the degree of correlation of said transparency imagery corresponding to each of said product image portions;

displacement means for periodically displacing the imagery on one of said transparencies with respect to the imagery on the other of said transparencies to produce displacement proportional signals; and output means for processing said output signal and said proportional signals to provide a signal representative of relative image distortion.

* * * * *